March 13, 1962     R. W. GRETTER     3,024,956
CABLE ENGINE PRESSURE REGULATING EQUIPMENT
Filed May 31, 1960     3 Sheets-Sheet 1
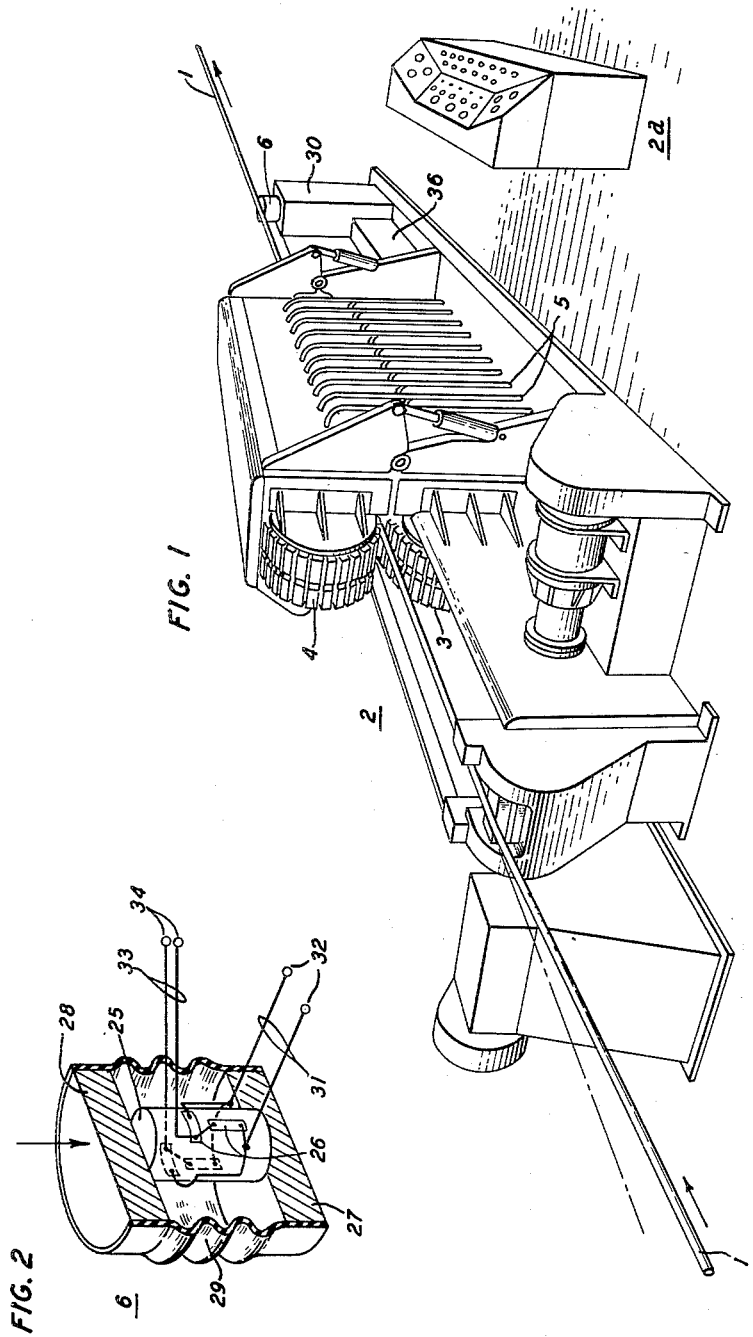
INVENTOR
R. W. GRETTER
BY
Stoddard
ATTORNEY INVENTOR
R. W. GRETTER
BY
Stoddard
ATTORNEY March 13, 1962     R. W. GRETTER     3,024,956
CABLE ENGINE PRESSURE REGULATING EQUIPMENT Filed May 31, 1960     3 Sheets—Sheet 3

INVENTOR
R. W. GRETTER
BY
*B. Stoddard*

ATTORNEY

United States Patent Office 3,024,956
Patented Mar. 13, 1962

3,024,956
CABLE ENGINE PRESSURE REGULATING
EQUIPMENT
Ralph W. Gretter, Tewksbury Township, Hunterdon County, N.J., assignor to Bell Telephone Laboratories, Incorporated, New York, N.Y., a corporation of New York
Filed May 31, 1960, Ser. No. 32,788
8 Claims. (Cl. 226—34)

This invention relates to cable-handling equipment for applying gripping pressure to a cable in order to control the movement of the cable from a point of low tension to a point of high tension and, more particularly, to means for varying the instantaneous applied pressure in accordance with variations in the instantaneous tension in the cable. The invention is especially useful when it is applied to a caterpillar cable engine employed in handling ocean communication cable of the armorless type.

During the process of handling cable, such as when an ocean cable is being laid, the cable is usually coiled in a stowage tank on a ship and is then payed out into the ocean by means of some type of cable-handling equipment. This equipment is ordinarily designed to function as a driving force at the beginning of the laying of a cable in order to pull the cable out of its stowage tank and convey it into the ocean. After a sufficient length of cable has been overboarded to pull its own weight, the cable-handling equipment then functions as a brake for the purpose of controlling the rate of movement of the cable.

The weight of the portion of the cable that is suspended between the cable-handling ship and the bottom of the ocean produces considerable tension in the cable, especially when the cable-handling operations are being performed in water that is several miles deep. This relatively high tension is an important factor in determining the design requirements of equipment for handling cable, especially communication cable of the armorless type. The importance of this tension factor in relation to the problem of handling armorless communication cable can be better appreciated from the following description of the structure of an armorless communication cable.

One type of armorless communication cable has its outer covering formed of a suitable plastic material, such as polyethylene, and has its main strength member constituted by an inner central core made of appropriate strong material, such as stranded steel wires. This cable also comprises two coaxial electric conductors. The inner coaxial conductor is constituted by a thin sheath of a suitable high conductivity metal, such as copper, in the shape of a tube or spirally wrapped tape. This is formed tightly around the strong core member so as to be virtually integral therewith. A suitable intermediate dielectric material, such as polyethylene, is molded in a cylindrical shape around the inner conductor in order to separate it from the outer conductor. The outer coaxial conductor is also made of a suitable high-conductivity metal, such as copper, in the form of one or more tapes wrapped tightly around the cylindrical intermediate dielectric material. This outer conductor is protected by an external coating of a suitable plastic insulating material, such as polyethylene or polyvinyl chloride.

From a cable-handling standpoint, it is important to note that the interfaces between the several components of this coaxial cable are unbonded. In other words, there is no substantial chemical cohesion between the inner and outer copper coaxial conductors and the intermediate plastic dielectric material. Due to this lack of cohesion, equipment for handling this type of cable should be designed to prevent excessive shear forces from being applied to any one portion of the cable as, otherwise, the plastic intermediate dielectric material might slip with respect to the inner or outer coaxial conductors with the result that the coaxial conductors might become deformed and thereby impair the signal transmitting qualities of the cable. Therefore, it is desirable to employ handling equipment that will grip and engage a relatively long section of the cable. It is also desirable to avoid using equipment that would subject the cable to radial bends which might crack the plastic material or deform the configuration of the coaxial conductors. Accordingly, the equipment should engage the cable over a straight section thereof without imposing any substantial bending force upon the cable.

A cable-handling facility that fulfills these requirements is a caterpillar cable engine having oppositely disposed mating tracks comprising a multiplicity of juxtaposed gripping units which are linearly translatable over a path of travel that is parallel to a long straight section of the cable. Thus, by passing the cable between the oppositely disposed tracks and by forcing the gripping units to apply pressure to the cable, the movement of the cable can be controlled. This control is, therefore, dependent upon the frictional shear stresses exerted by the gripping units against the surface of the cable. Due to the nature of the friction phenomenon, these shear stresses are, in turn, dependent upon imposed loads that are normal to the gripping surfaces. Accordingly, by applying axial shear loads to the surface of the cable through the medium of the multiplicity of gripping units, it is possible to absorb the cable tensile load.

In this manner, the total gripping force exerted by the caterpillar cable engine is distributed among a relatively large number of individual gripping units, such as gripper blocks or shoes. Since the gripping area of each individual unit engages only a small portion of the cable, the length of the mating section of the caterpillar tracks is designed to be sufficient to include enough pairs of gripping units for adequately absorbing the total tensile load. However, care must be exercised to insure that the cable is not gripped too tightly between the mating tracks of the caterpillar engine as otherwise the components of the cable might slip with respect to each other. Such slippage is particularly liable to take place between the intermediate plastic dielectric material and the inner coaxial conductor.

Accordingly, an object of this invention is to provide means for minimizing the subjection of an armorless cable to excessive shear stresses while it is being handled under tension.

Another object of the invention is to provide means in a cable-handling engine for controlling the shear force exerted per unit length along the internal interfaces between the components of an armorless cable.

An additional object of the invention is to provide a caterpillar cable-handling engine with regulating means for controlling the amount of force exerted by its gripping devices in accordance with the tension in a cable that it is handling.

A further object of the invention is to provide a caterpillar cable-handling engine with tension-responsive means for controlling the pressure exerted by the engine upon a cable in such a manner as to gradually extend or increase the application of pressure along the mating section of the caterpillar tracks progressively from the outboard end of the engine toward its inboard end so that the instantaneous pressure varies in accordance with the instaneous tension in the cable.

These and other objects of the invention are attained by providing a cable-handling engine with regulating means for varying the degree of control exercised by the engine upon a cable in proportion to the tension to which the cable is subjected. For example, a caterpillar cable-handling engine having a multiplicity of gripping units for applying pressure normal to a longitudinal portion of a cable is provided with means for regulating the applied pressure in accordance with the tension in that portion of the cable which is near the outboard end of the engine. In one form of the invention, the instantaneous gripping pressure is applied uniformly through the length of the engine in amounts that vary in accordance with variations in the cable tension. In another form of the invention, the instantaneous gripping pressure is caused to be extended progressively from the outboard end of the engine toward its inboard end in accordance with increases in the cable tension. In an additional form of the invention, the pressure at the inboard end of the engine is caused to be increased in response to the occurrence of abnormally high cable tensions.

These and other features of the invention are more fully discussed in connection with the following detailed description of the drawing in which:

FIG. 1 is a perspective view of a caterpillar cable-handling engine;

FIG. 2 is a three-dimensional view partly in section of a device for producing electric signals indicative of the tension in a cable;

Figure 3:
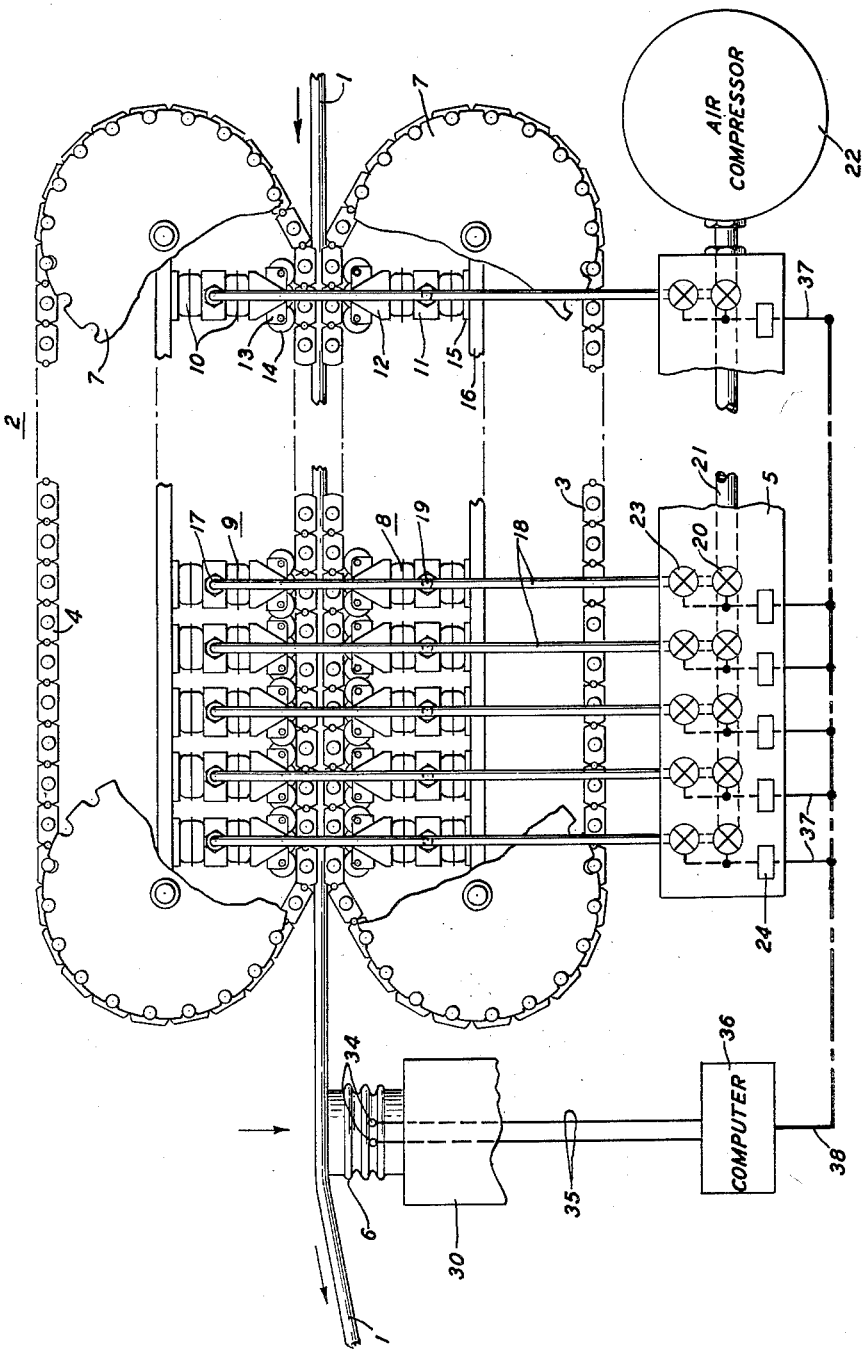
FIG. 3 is a side view partly in section of the caterpillar engine together with tension-responsive means for regulating its gripping pressure.

In FIG. 1, an armorless ocean communication cable 1 of the type described above is represented as having its movement controlled by a caterpillar cable-handling engine 2. The engine 2 is essentially similar to the caterpillar cable engines disclosed in Patent 2,981,454 issued to F. R. Dickinson and H. N. Upthegrove on April 25, 1961, and also in Patent 2,981,452 issued to S. W. Baker and F. W. Schwab on April 25, 1961, and a complete understanding of its construction and operation may be obtained by reference thereto. As is indicated in the drawing, the engine 2 is provided with a first group of cable-gripping units 3 connected in a lower endless track formation and a second group of similar cable-gripping units 4 arranged in an upper continuous track formation.

These upper and lower caterpillar track formations of the gripping units 3 and 4, which may be in the form of gripper blocks or shoes, are oppositely disposed with respect to each other in such a manner as to form a longitudinal mating section which engages or grips opposite sides of the cable 1, as is best seen in FIG. 3, for the purpose of transferring the tensile load from the cable 1 to the caterpillar engine 2. This mating track section has an appreciable length, such as twenty feet, so that the absorption of the cable tensile load will be distributed among a relatively large number of the individual gripping units 3 and 4. The gripping action of the units 3 and 4 is effected by means comprising a pressurized air manifold system 5 which is regulated or controlled in a manner described hereinafter by tension-responsive means 6 positioned to engage the cable 1 at a point of high tension near the exit end of the engine 2.

During the operations of laying or recovering the cable 1, control of its movement is effected by the gripping action exerted on opposite sides thereof by the juxtaposed gripping units 3 and 4 which have their track formations driven or restrained by a plurality of large sprocket wheels 7, shown in FIG. 3. These sprocket wheels 7 are operated by an appropriate source of power, such as a hydraulic system driven by electric motors. The power system is arranged to function as a drive motor in one direction for cable-recovery operations and as a pump in the other direction for use as a brake during cable-laying operations. The power system is further designed to act as a drive motor at the start of cable-laying operations for the purpose of pulling the cable from its stowage tank until a sufficient length of cable has been overboarded to pull its own weight. These different functions of the power system can be selected by operating appropriate switches in an associated control console 2a.

Referring to FIG. 3, it can be seen that a plurality of stationary pneumatic loading units 8 are located beneath the mating section of the caterpillar tracks and are designed to push upward against the lower gripping units 3. A similar plurality of pneumatic loading units 9 are disposed above the mating section of the tracks and are arranged to push downward against the upper gripping units 4. The construction of these pneumatic loading units 8 and 9 is fully disclosed in the above-mentioned Dickinson-Upthegrove and Baker-Schwab patents.

Briefly, each of the loading units 8 and 9 comprises two air springs 10 mounted in tandem on a metallic spacing member 11. In each pair of air springs 10, the one nearest to the mating section of the track supports a saddle member 12 having a truck member 13 pivotally attached thereto. Each truck member 13 carries a plurality of rollers 14 rotatably mounted thereon in such a manner as to bear against the adjacent track formation. Also, in each pair of air springs 10, the one that is farthest from the mating section of the track is mounted upon a flat metallic plate 15 which is fastened to a chassis member 16 of the engine 2.

The two air springs 10 in each of the loading units 8 and 9 are interconnected by a T-shaped tube mounted within the spacing member 11 and having its base 17 projecting outward for providing an input termination for compressed air. Each of the upper loading units 9 has its input termination 17 connected to the upper end of a respectively different one of a number of flexible hoses 18 extending upward from the compressed air manifold 5. In addition, each hose 18 is provided with an intermediate tap 19 which is connected to the input termination 17 of that one of the lower loading units 8 which is directly beneath the upper loading unit 9 to which the hose 18 is connected. In other words, each hose 18 supplies compressed air to the four air springs 10 in a vertically arranged pair of lower and upper loading units 8 and 9.

The lower end of each hose 18 is connected to one of a plurality of individually operable supply valves 20 in the air manifold 5. These valves 20 are each connected to a pipe 21 which is supplied with compressed air produced by a suitable air compressor 22. Thus, the loading force applied to the cable 1 by the gripping action of any pair of the loading units 8 and 9 can be increased as desired by opening the appropriate supply valve 20 to allow a larger quantity of compressed air to enter the associated hose 18.

In order to decrease the gripping pressure exerted by any pair of the loading units 8 and 9, the air manifold 5 is provided with a plurality of individually operable relief valves 23. Each relief valve 23 is connected to a respectively different one of the hoses 18 near the lower end thereof and is provided with a vent for permitting air to escape from the associated hose 18. These vents are equipped with conventional pressure-responsive means which are adjustable to prevent further escape of air after a selected pressure has been reached.

The supply valves 20 and the relief valves 23 are operated by a plurality of servo-solenoids 24 which are each connected to a respectively different one of the supply valves 20 and also to a corresponding one of the relief valves 23. In other words, each supply valve 20 and its associated relief valve 23 are connected in tandem to a respectively different one of the servo-solenoids 24 so that the valves 20 and 23 in each pair can be operated simultaneously in a manner well known to those skilled in the art.

Since it is desired that the gripping pressure exerted by the loading units 9 and 10 be regulated in accordance with the instantaneous tension in the cable 1, the operation of the servo-solenoids 24 is designed to be controlled by the tension-responsive means 6 mentioned above. The tension-responsive means 6 may be of any suitable type known to those skilled in the art, such as the load cell 6 shown in detail in FIG. 2.

In FIG. 2, a cylindrical compression member 25 is provided with four resistance wire strain gauges 26 of suitable design and arranged in oppositely oriented pairs. The cylinder 25 is mounted on a circular base 27 of suitable material. A similar circular member 28 is mounted on top of the cylinder 25. A cylindrical housing member 29 is attached to the circumferential edges of both the base 27 and the top 28. This housing member 29 is made of a suitable waterproof material, such as rubber, for the purpose of protecting the cylinder 25 from rain or other moisture. If desired, the housing member 29 may include a reinforcing coiled spring embedded in the rubber material.

As is represented in the drawing, the load cell 6 is located near the output end of the engine 2 and is mounted directly under the path of travel of the overboarding portion of the cable 1 so as to engage, or be in contact with, the cable 1. It is mounted in any convenient manner on a strong unyielding support 30 which is of such a height that the cable 1 bears down upon the top of the load cell 6 as is indicated by the vertical arrow in FIG. 3. It can be understood that this downward force exerted by the cable 1 upon the top of the load cell 6 will vary with the tensile load in the overboarding portion of the cable 1. For example when the cable 1 is just emerging from the engine 2 at the beginning of a cable-laying operation, it will be under very little tension and will bear lightly upon the load cell 6. On the other hand, if the cable 1 is being layed in a part of the ocean that is two or three miles deep, it will have a high tensile load and will bear down heavily upon the load cell 6.

Figure 5:
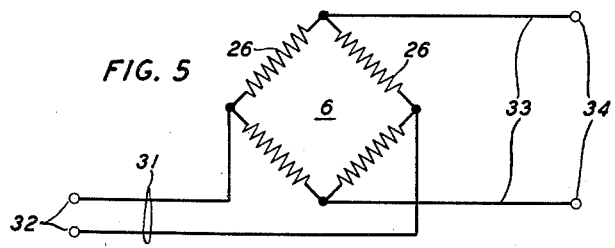
FIG. 5 is a diagram of a signal responsive electric circuit for controlling the gripping force of the cable engine.

The force thus exerted by the tensile load in the cable 1 upon the load cell 6 produces a compressive strain upon the cylinder 26 which changes the electric resistance of the wire strain gauges 26 in a manner well known to those skilled in the art. In order to translate these electric resistance changes into electric signaling energy, the four strain gauges 26 are connected into a Wheatstone bridge formation as is represented in FIG. 5. One pair of opposite points on the bridge is connected by two electric conductors 31 to a pair of input terminals 32 to which a suitable excitation voltage is applied. The other pair of opposite points on the bridge is connected by two other electric conductors 33 to a pair of output terminals 34. These output terminals 34 are connected, as is shown in FIG. 3, by two more electric conductors 35 to an electronic computer 36.

Since the strain gauges 26 are arranged in the form of a Wheatstone bridge, changes in the cable tensile load produce corresponding changes in the resistance of the arms of the bridge with the result that the input or excitation voltage applied to the terminals 32 is modified in passing through the bridge to the output terminals 34. The resulting output voltage is proportional to the excitation voltage supplied to the input terminals 32 and also to the force applied by the cable 1 to the top of the load cell 6. Due to the fact that the force applied to the load cell 6 is proportional to the tension in the cable 1, the variable voltage that appears at the output terminals 34 constitutes electric signaling energy indicative of the value of the instantaneous tension in the cable 1.

When this signaling energy arrives at the electronic computer 36, it is, in effect, subdivided into suitable components in the computer 36 in a manner known to those skilled in the art. The computer 36 then applies an electric control signal, representing a fractional part of the received voltage, to each of a plurality of conductors 37 in a multi-conductor cable 38 leading to the air manifold 5. In the manifold 5, the conductors 37 branch out from the cable 38 so that each conductor 37 is electrically connected to a respectively different one of the servo-solenoids 24. These electric connections are so arranged as to cause the servo-solenoids 24 to operate the supply valves 20 and the relief valves 23 in such a manner as to supply compressed air to the hoses 18 in quantities determined by the above-mentioned subdivided signaling energy. Thus, the total instantaneous gripping pressure exerted by the engine 2 along the mating section of its caterpillar tracks is controlled, or varied, in accordance with variations in the instantaneous tension in the cable 1.

Figure 4:
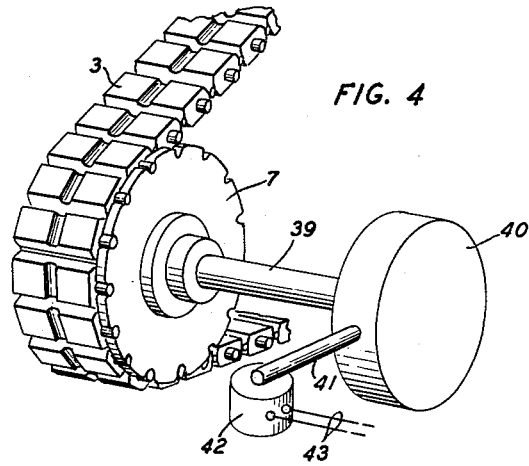
FIG. 4 is a perspective view of an arrangement for producing electric signals indicative of the torque produced by the cable engine.

Although the load cell 6 has been represented as being directly operated by the cable 1 for producing a variable voltage for controlling the operation of the computer 36, various other arrangements may be employed for this purpose if desired. For example, since the torque of the sprockets 7 in the cable engine 2 is related to the tension in the cable 1, it can be translated into signaling energy and applied to the computer 36 for controlling its operation. This can be accomplished, as is shown in FIG. 4, by using a shaft 39 to couple one of the sprockets 7 to a suitable electric slip-clutch or eddy current brake 40 having a conventional torque arm 41. A load cell 42, similar to the load cell 6, is mounted immediately beneath the torque arm 41 and is provided with two output conductors 43 which extend to the input of the computer 36 in the same manner as the conductors 35 shown in FIG. 3. During cable-handling operations, the torque arm 41 reacts against the load cell 42 thereby causing it to produce a variable voltage which is sent over the conductors 43 to the electronic computer 36 for controlling its operation in a manner similar to that described above.

Figure 6:
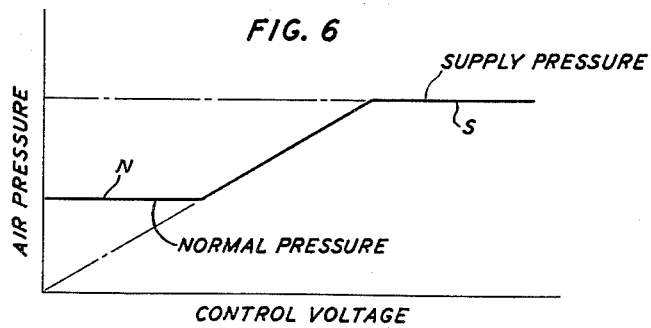
FIG. 6 is a chart illustrating the relation between the tension in a cable and the gripping pressure exerted by a cable engine.

Thus, by using appropriate means for deriving a control voltage which varies in proportion to changes in the cable tensile load, the air pressure supplied to the loading units 8 and 9 can be correspondingly varied over a wide range as is indicated in FIG. 6. In FIG. 6, the horizontal line N represents the normal or average air pressure supplied to the loading units 8 and 9 for ordinary cable tensile loads. The upper horizontal line S represents the constant air pressure supplied by the air compressor 22 to the input of the air manifold 5. This supply pressure S is appreciably larger than the normal pressure N in order to provide a reserve capacity which is readily available for use in holding the cable during periods of emergency when excessive cable tensile loads might occur.

Th control voltage produced by the load cell 6 can be utilized by the computer 36 to control the operation of the servo-solenoids 24 in various ways. For example, the electric connections in the computer 36 may be arranged in such a manner as to effect identical operation of all of the servo-solenoids 24 thereby admitting, at any one time, the same amount of compressed air to each of the hoses 18. This results in the gripping pressure being applied in uniform amounts along the mating section of the caterpillar tracks. However, the instantaneous gripping pressure is made to vary uniformly throughout the length of the engine 2 in proportion to variations in the cable tension. The constant of proportionality is selected to be such that the cable tension decays to zero within the length of the track mating section at a rate which does not cause internal slip for ordinary laying tensions.

An alternative method is to arrange the electric connections in the computer 36 in such a manner as to cause the instantaneous gripping pressure to be extended or increased progressively from the outboard end of the engine 2, which is the point of high cable tension toward its inboard end, which is the point of low cable tension.

Thus, the gripping pressure along the track mating section is so controlled, in effect, as to be applied to a variable length of the track mating section, beginning at its outboard end, in accordance with variations in the cable tensile load.

Another method is to divide the loading units 8 and 9 into an outboard group and an inboard group. The computer 36 is then designed to cause the servo-solenoids 24 to supply less compressed air to the outboard group of hoses 18 than to the inboard group of hoses 18. Thus, the group of loading units 8 and 9 at the high tension or exit end of the engine 2 will apply a smaller degree of gripping pressure to the cable 1 while the gripping units 8 and 9 at the low tension or entrance end of the engine 2 will apply a larger degree of gripping pressure. This causes the cable 1 to be gripped relatively loosely in an area where its tension is high while being gripped tightly in an area where its tension is low.

When the gripping pressure is applied in this last-mentioned manner, axial external slip of the cable 1 with respect to the track mating section will be permitted in the area near the outboard end of the engine 2 thereby allowing the cable 1 to stretch at a uniform tension-decay rate with a low value of internal axial shear force per unit length. The gripping pressures are further selected to be such that, at ordinary laying tensions, the zone, in which external slip occurs, will propagate into the engine 2 a distance less than the length of the low pressure gripping region. When unusually high laying tensions occur, the zone in which external slip takes place will propagate into the high gripping pressure region, and the excess tension will decay at a higher rate with correspondingly larger axial shear force per unit length. Thus, reserve holding capacity is readily available during periods of emergency as was discussed above.

It is to be understood that, with any of the above methods, unnecessarily large gripping pressure is always avoided because the total instantaneous gripping pressure is constantly selected to be only the amount necessary for controlling the cable and, as was explained above, the selection of a particular total gripping pressure to be used at any given instant is dependent upon the cable tension at that time.

What is claimed is:

1. Cable-handling equipment comprising a track adapted to guide a cable, pressure means adapted to exert variable pressure against the cable guided by said track, tension-responsive means adapted to engage a portion of a cable that has been guided by said track for producing a voltage which varies in proportion to tensile load variations in said cable, and control means operated by said voltage for varying the pressure exerted by said pressure means in accordance with variations in said voltage.

2. Cable-handling equipment comprising a track adapted to guide the passage of a cable from a point of low cable tension to a point of high cable tension, pressure means adapted to apply pressure against a variable length of said track, and control means for alternatively extending and retracting the application of said pressure along said track from said point of high cable tension to said point of low cable tension, said control means being electrically connected to said pressure means for operation thereof.

3. Cable-handling equipment comprising a track for guiding a cable from a point of low tension to a point of high tension, a plurality of loading units disposed along said track for individually applying variable degrees of pressure to a cable guided by said track, pressure regulating means connected to each of said loading units for separately varying the pressure applied by each of said loading units, tension-responsive means adapted to engage a cable at said point of high tension for producing a variable voltage proportional to the cable tension, and control means adapted to receive said voltage for controlling the operation of said pressure regulating means in accordance with variations in said voltage.

4. Cable-handling equipment comprising an engine having a track for guiding the passage of a cable, a plurality of gripping units disposed seriatim along said track for exerting gripping pressure against a cable guided by said track, a plurality of pressure regulating means each connected to a respectively different one of said gripping units for controlling the pressure exerted by said units, control means for operating said pressure regulating means for effecting a gradual application of pressure progressively along the extent of said track, and means for deriving electric signals indicative of the instantaneous tension in a cable guided through said engine, said control means being adapted to receive said signals and to transmit electric energy representing portions of said signals to said pressure regulating means for controlling the operation thereof.

5. Cable-handling equipment comprising a caterpillar cable engine having an input end and an output end, track means adapted to guide a cable through said engine from said input end to said output end, a plurality of loading units disposed along said track means for individually exerting variable pressure against a cable guided by said track means, means adapted to produce a variable voltage proportional to the cable tensile load at the output end of said engine, control means for individually controlling the pressure exerted by each of said loading units, and means for applying said voltage to said control means for increasing the pressure exerted by at least the loading units at the input end of said engine in response to an increase in cable tensile load.

6. Cable-handling equipment comprising a caterpillar cable engine having two oppositely disposed endless tracks, means for translating both of said tracks simultaneously through said engine, said tracks having a common longitudinal mating section adapted to engage opposite sides of a cable for controlling its passage through said engine from a point of low cable tension to a point of high cable tension, a plurality of loading units disposed along the length of said mating track section for individually applying pressure to said mating section for gripping a cable therebetween, pressure regulating means connected to each of said loading units for individually varying the pressure exerted by each of said loading units, and control means for controlling said pressure regulating means for causing the pressure exerted by said loading units to be applied progressively along said mating track section from said point of high cable tension to said point of low cable tension.

7. Cable-handling equipment comprising a caterpillar cable engine having two oppositely disposed endless tracks, means for translating both of said tracks simultaneously through said engine, said tracks having a common longitudinal mating section adapted to engage opposite sides of a cable for controlling the passage of said cable through said engine, a multiplicity of loading units oppositely disposed along the length of said mating track section for individually exerting pressure against said mating tracks and a cable passing therebetween, means for deriving electric signals indicative of the instantaneous tension in a cable handled by said engine, control means for individually controlling the amount of pressure exerted by each of said loading units, and means for applying said electric signals to said control means for varying said pressure in accordance with said signals.

8. Cable-handling equipment comprising a caterpillar cable engine having an entrance end and an exit end, said engine including a track adapted to guide a cable through said engine from said entrance end to said exit end, a plurality of loading units disposed along said track, each of said loading units being adapted for individually exerting pressure against a cable guided by said track, a plurality of pressure regulating means each adapted to regulate the pressure exerted by a respectively different one of said loading units, control means for separately controlling each of said pressure regulating means, means at the exit end of said engine adapted to produce electric energy indicative of the tension in a cable guided out of said engine by said track, and means adapted to transmit said electric energy to said control means, said control means being adapted to transmit to said pressure regulating means electric control signals representing fractional parts of said electric energy.

References Cited in the file of this patent
UNITED STATES PATENTS

| | | |
|---|---|---|
| 2,797,798 | Hallden | July 2, 1957 |
| 2,931,962 | Huck | Apr. 5, 1960 |
| 2,944,747 | Miller | July 12, 1960 |